June 30, 1964 A. ALVAREZ-CALDERON 3,139,248
VARIABLE GEOMETRY SYSTEM AND APPARATUS FOR AIRCRAFT
Filed June 15, 1961 5 Sheets-Sheet 1
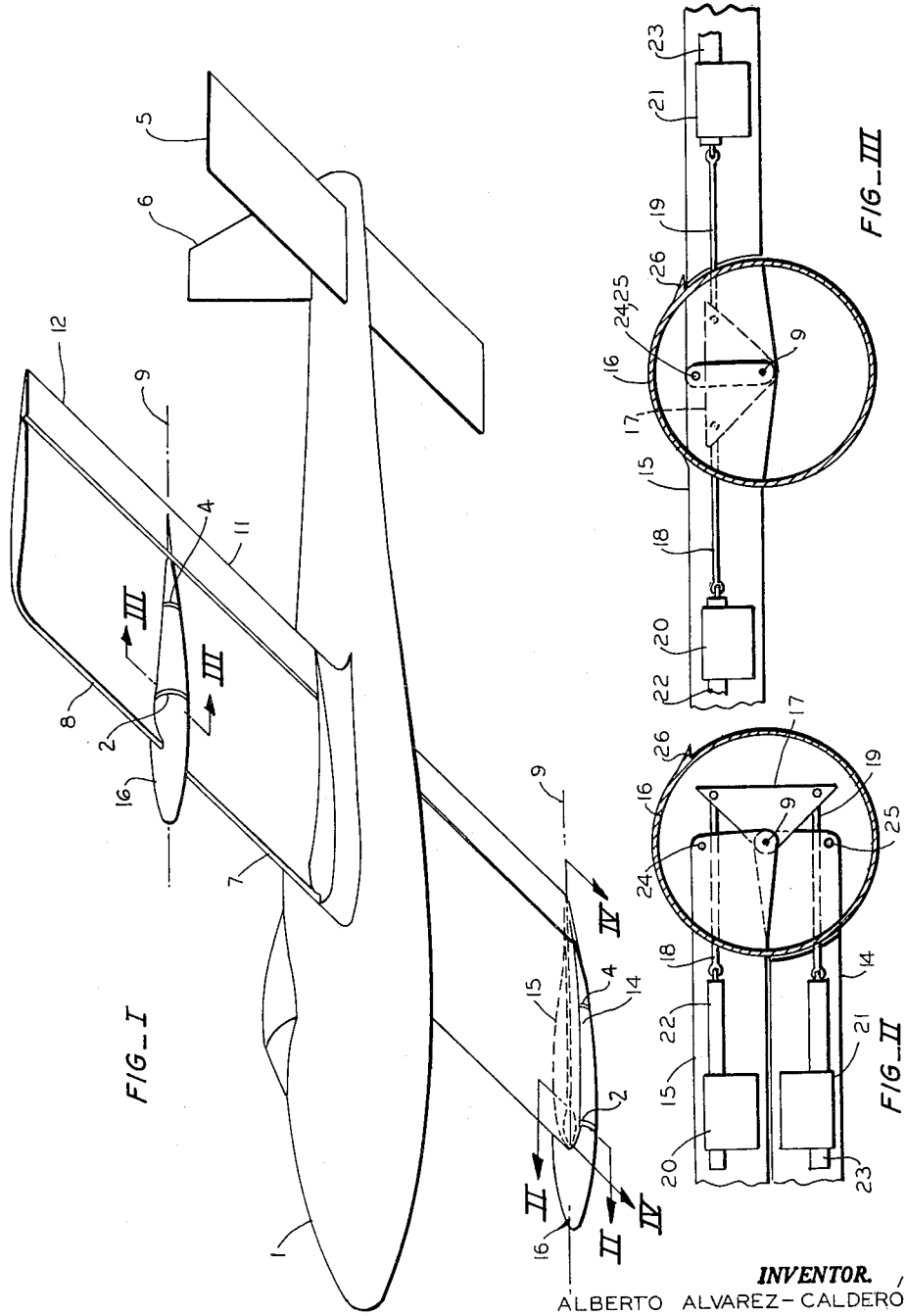
INVENTOR.
ALBERTO ALVAREZ-CALDERON

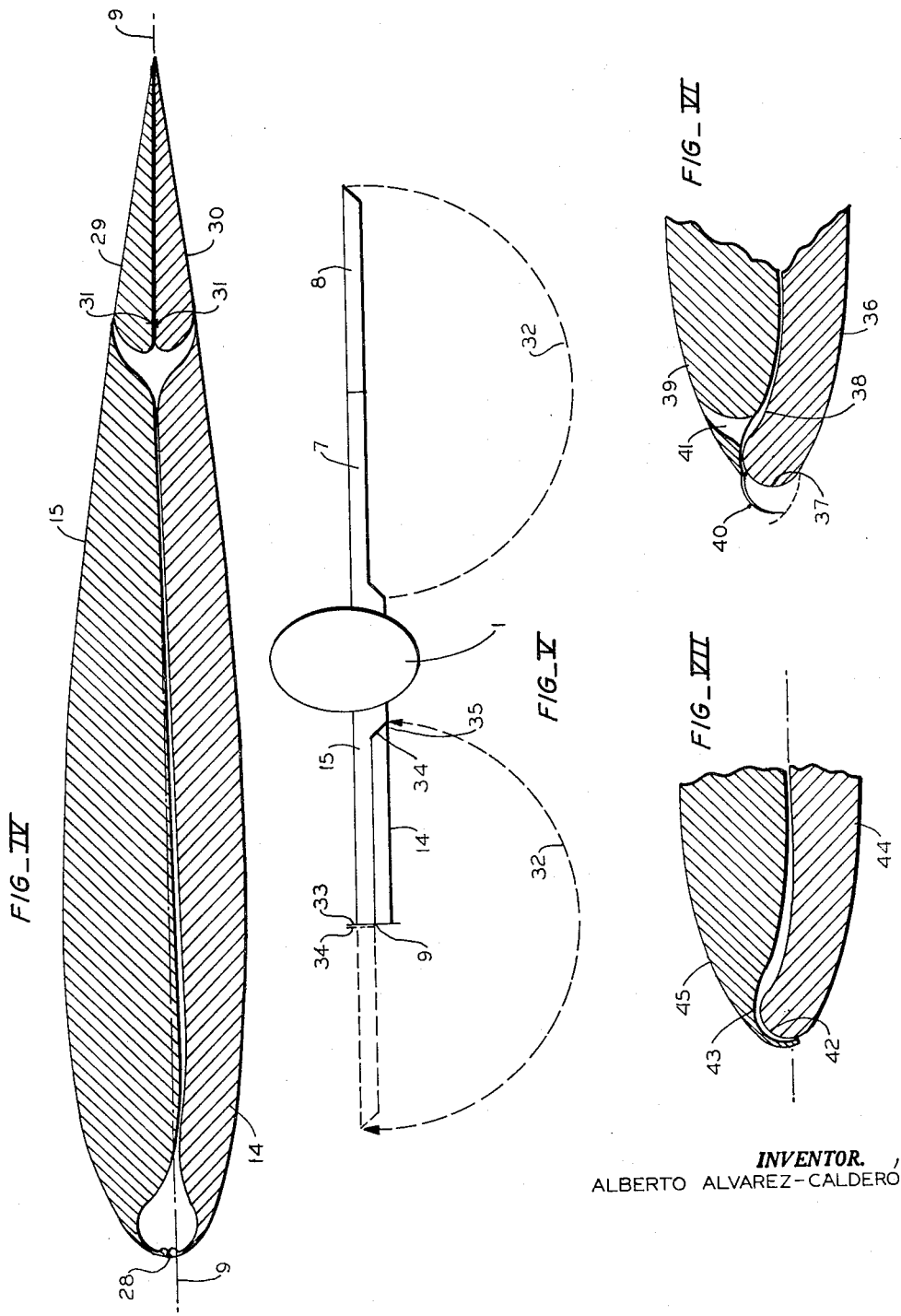

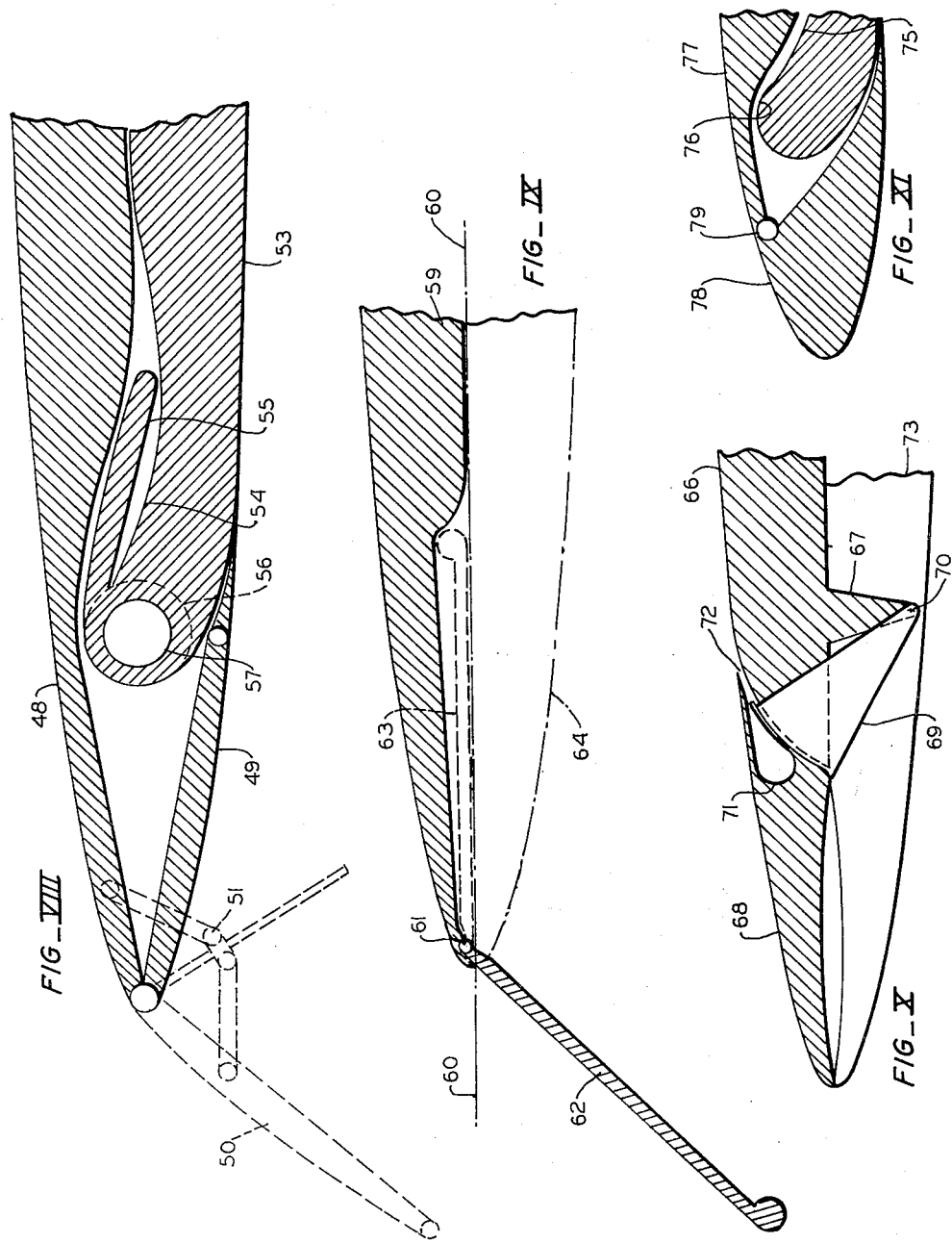

FIG_XIV

FIG_XV

FIG_XVI

INVENTOR.
ALBERTO ALVAREZ-CALDERÓN

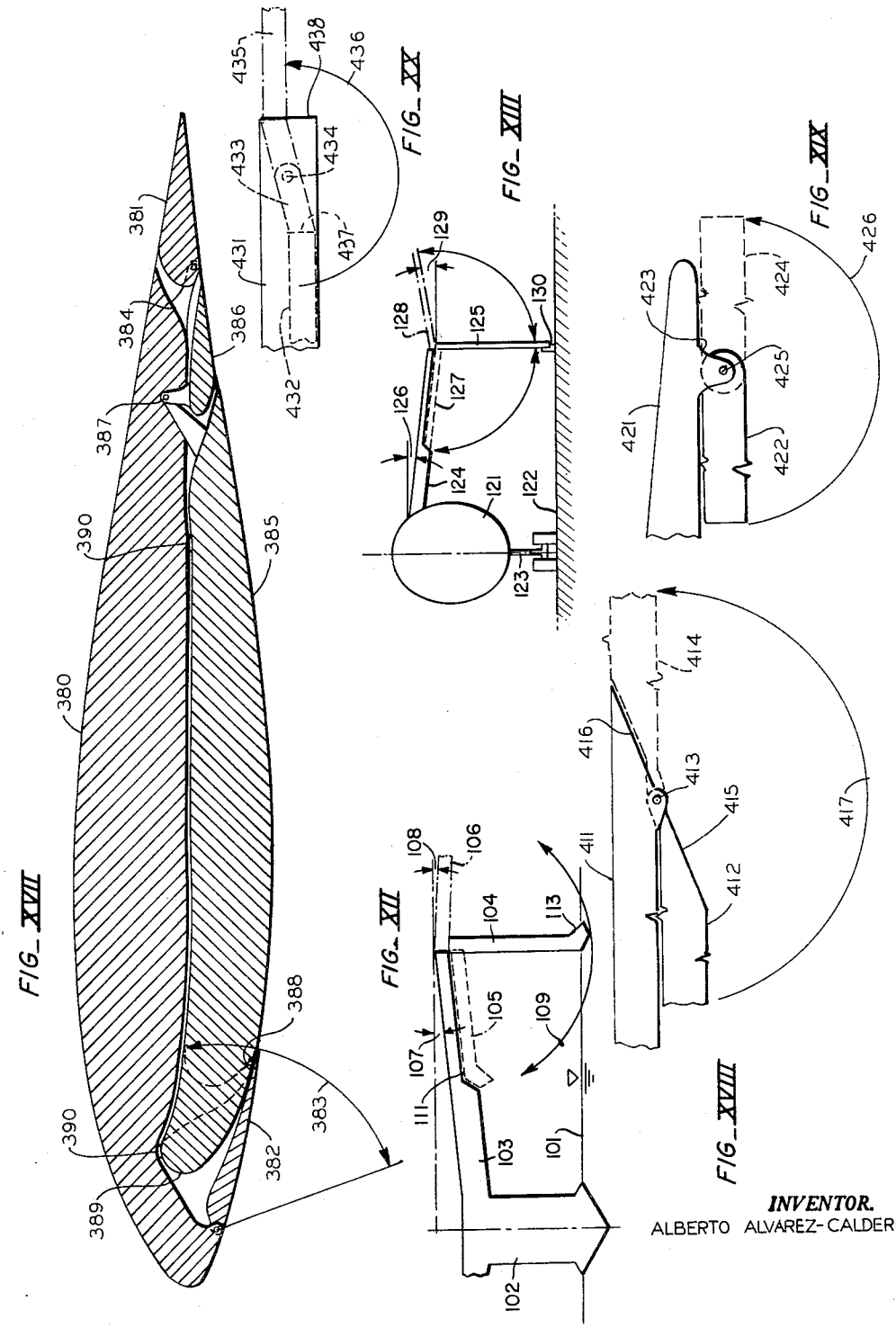

United States Patent Office 3,139,248
Patented June 30, 1964

3,139,248
VARIABLE GEOMETRY SYSTEM AND
APPARATUS FOR AIRCRAFT
Alberto Alvarez-Calderon, 1560 Castilleja St.,
Palo Alto, Calif.
Filed June 15, 1961, Ser. No. 117,331
28 Claims. (Cl. 244—42)

The present invention relates generally to variations of the shape of aircraft surfaces to enable higher aircraft speeds and/or altitudes, shortened ground distances for take-off and landing, and increased aircraft stability and control in its various speed regimes. More specifically, this invention concerns novel, practical and efficient methods to increase the area of a wing in a spanwise direction, and with new ways to obtain variation of airfoil thickness and camber with a method particularly suitable to be used together with boundary layer control by blowing.

In my co-pending application Serial 48,038, of August 8, 1960, I have described some of the problems and limitations encountered in present high performance aircraft of high subsonic speeds and supersonic speeds, as well as short take-off and vertical take-off aircraft. In the present invention I have achieved a new and ingenious method to vary the aircraft's wing area by simple structures which will be described later.

It is well known that a variable wing area improves the aircraft performance very substantially. In the past, variations of the wing area in the spanwise direction have been considered by means of structures which were so complicated that their use has not been incorporated to production aircraft. In U.S. Patent 2,858,091 one such system is described, consisting of telescopic wing tip portions for aircraft. The structural problems encountered are obvious from reading the details of the patent.

In my invention, spanwise variation of area is achieved first by splitting a wing panel in a horizontal plane which, in a chordwise direction, passes approximately through the middle of the wing's airfoil section, and then by unfolding the split components of the wing panel generally in a spanwise direction about one common chordwise hinge axis between the ends of the split panel components, to produce effectively a doubling of the wing panel area. The methods to provide a high speed airfoil contour in the original wing panel, but yet allow high lift for low speeds in the extended wing panel components, is prescribed with detail. There are also shown various ways to obtain satisfactory high lift and control surfaces, as well as stability characteristics, for such a wing arrangement. Some of these methods are also applicable to normal wings. This novel type of wing which splits and unfolds will be referred to hereafter as my compound wing.

It is a general object of my invention to provide aerodynamic structures and apparatus to vary the lifting surfaces, area, and shape of an aircraft or flying body, including missiles.

It is a more specific object of my invention to vary the wing area of an aircraft, generally in a spanwise direction, in order to increase its speed range and efficiency.

Another object of my invention is to vary the profile of aircraft wings depending upon the speed of the aircraft.

Yet another object of my invention is to provide structures capable of varying the span and wing profile of an aircraft at will.

An additional object of my invention is to provide a method of wing area and sweep variations which simplifies the pitch stability and control problems associated with variations of lift forces and relative mass distribution of the moving parts in the different flight conditions.

Another object of my invention is to permit the variable wing area surfaces to be supported by simple hinges which are loaded principally in the low speed regime of flight only.

Yet another object of my invention is to provide variation of dihedral angle for aircraft utilizing wing area variations to improve roll, yaw and directional characteristics in the various speed regimes.

One more object of my invention is to provide ground or water roll stability for aircraft utilizing variable wing area, at speeds in which aerodynamic forces are not available.

Yet another object of my invention is to provide aircraft utilizing variable wing area which are especially suited for operation out of aircraft carriers, submarines and other facilities which have limited storage space.

One more feature of my invention is to provide a means to vary the wing area and planform to enable efficient operation at various speeds, weights and altitudes.

These as well as other objects and features of my invention will become more apparent from a perusal of the following description of the various embodiments illustrated in the accompanying drawings wherein:

FIGURE I shows a perspective view of an airplane utilizing my compound wing. The compound wing is shown, for purposes of illustration, extended on the left side of the airplane (upper portion of drawing) and retracted on the right side (lower portion of the drawing).

FIGURE II is a sectional view of a vertical plane of the retracted compound wing structure shown on the right side of the airplane of FIGURE I, showing a mechanism to fold and unfold the compound wing by substantially 180°.

FIGURE III is a sectional view in a vertical plane of the extended compound wing of the left side of the airplane of FIGURE I, showing the mechanisms of FIGURE II in the wing extended position.

FIGURE IV shows a chordwise cross-sectional view of the compound wing in the retracted position shown in the right side of the airplane of FIGURE I, prescribing in some detail each of the airfoil sections used in the compound wing to obtain low drag in the retracted position, but yet permit high lift for the slow speed extended position.

FIGURE V shows a frontal sectional view of the airplane of FIGURE I showing the kinematics of wing retraction and extension as well as other details.

FIGURES VI, VII, VIII, IX, X and XI show alternate partial cross-section of compound airfoil section illustrating the leading edge geometry which permits low drag in retracted position and high lift in the extended position.

FIGURE XII shows an application of my compound wing to amphibians and seaplanes.

FIGURE XIII shows another application of my compound wing to ground aircraft having a main undercarriage centrally located.

FIGURE XIV shows a planform view of a compound wing illustrating detail of pitch and directional stability.

FIGURE XV illustrates a planform view of a compound wing showing certain advantages of the system for aircraft of various speeds and weights.

FIGURE XVI shows another planform view of the compound wing illustrating methods to shift the center of pressure of the wing to comply to speeds of operation of aircraft.

FIGURE XVII shows a modified cross-sectional view of a compound wing of the type already illustrated in FIGURE IV, showing a non-interfering trailing edge device arrangement and a shortened chord on the lower pivoted wing panel.

FIGURES XVIII and XIX show partial front elevations of alternate methods to hinge compound wing panels.

The drawings, which are of the type shown in FIGURES II, III and XIII, show the kinematics of extension.

With initial reference to FIGURE I, there is shown an airplane having a fuselage 1, a horizontal tail 5, a vertical tail 6 and using a compound wing. Powerplants have been omitted. The compound wing is shown unsymmetrically, one side retracted and one side extended, for purposes of illustration. On the airplane's left wing, on the upper portion of the figure, there is shown the inner fixed wing panel 7 of the compound wing, attached to the fuselage. The pivoted wing panel 8 is shown extended and pivotally hinged at its root to the tip of fixed panel 7, at pivotal hinge axis 9 which lies generally in a chordwise direction. The compound wing as shown, is extended in the high lift position, and it shows an undercambered airfoil section on each of the panels for high lift.

Also shown are trailing edge devices 11 and 12 on wing panels 7 and 8, respectively. On the right side of the airplane, in the figure's lower portion, there is shown the compound wing in the retracted position, wherein the pivoted panel portion 14 has been rotated 180° from the extended position, about its chordwise hinge axis 9, to the position shown in which it forms the lower surface of the compound airfoil in the retracted high speed position. The tip of the pivoted portion now lies adjacent to the fixed wing root near the fuselage and is hidden by the fuselage in this drawing. The fixed portion of the compound wing which does not appear directly on the airplane's right wing, forms the entire upper surface of the compound airfoil in the retracted position. To clarify its position, its tip airfoil section is shown in dash lines 15, adjacent to wing tip pod 16. Tip pods 16 show slits 2 and 4 which allow 180° rotation of the spars (not shown) supporting the pivoted panel portions to hinge axis 9. The type of shape of each of the airfoils in the retracted position, corresponding to cut IV—IV in the craft of FIGURE I, is prescribed in more detail in FIGURE IV and other subsequent figures. Sectional cuts II—II and III—III and tip pod 16 are described in more detail in FIGURES II and III as follows:

FIGURE II corresponds to aforementioned sectional cut II—II of FIGURE I. Specifically, there is shown upper fixed panel portion 15, supporting at its tip a chordwise hinge pivot axis (into paper) and circular wing tip pod 16. The upper and lower skins of the upper fixed wing portion (not shown for clarity) need not penetrate inside the tip pod, and should be attached to it. The wing's spars however, should penetrate inside the tip pod in order to support the hinge axis as shown. The circular tip pod is concentric with the hinge axis. The hinge axis pivotally supports the pivoted wing portion 14, the outer and inner skins of which (not shown for clarity) should terminate outside and adjacent to the tip pod, with a small gap between them for clearance to permit circular motion of the pivoted portion of the wing round the circular tip pod.

Observe in FIGURE II locking pin holes 24 and 25 on the fixed wing portion 15 and 14 respectively, and protrusion 26 on tip pod 16, the purpose of which will be described more fully in FIGURE III. In FIGURE II there is also shown one type of mechanism used to fold and unfold the wing: There is shown, pivotally supported also at axis 9, a triangular link connection 17 which is not rigidly attached to either wing panel, but connected through links 18 and 19 to shafts 22 and 23 of actuators 20 and 21 on fixed panel 15 and pivoted panel 14 respectively. Actuators 20 and 21 may be hydraulic, electric or pneumatic, but in any case their shafts 22 and 23 respectively, should be constrained to move in a fixed path.

To unfold the wing, the following actions, which may be simultaneous, are necessary: Full displacement to the left of shaft 22 by means of actuator 20, to rotate triangular link 90° with respect to, and towards, the fixed wing panel 15. This action by itself would result in 90° downward motion of the lower pivoted wing panel portion. Additionally, shaft 23 on actuator 21 should be fully displaced away from the triangular link, to rotate pivoted wing portion 90° with respect to triangular link 17. Evidently, the two 90° relative rotations result in the 180° unfolding of the lower pivoted portion to the position shown in FIGURE III.

FIGURE III therefore, shows a cut of the compound wing in the extended position, also indicated schematically as cut 3—3 in FIGURE I. Specifically there is shown fixed wing portion 15 supporting tip pod 16, hinge axis 9, and triangular link 17, rotated fully 90° with respect to, and towards, the fixed wing portion. Also shown fully displaced to the left are links 18 and shaft 22 of actuator 20. There is shown in the fully extended position pivoted wing portion 14, wherein its upper surface forms a spanwise projection of the upper surface of fixed portion 15. Observe that the pivoted portion has been rotated by 90° with respect to the triangular link 17 by displacement of link 19 and shaft 23 away from the triangular link, by actuator 21. With reference to wing locking devices in the extended positions, locking holes 24 and 25 on panel portions 15 and 14 are now aligned to receive a locking pin which would fall into the plane of the paper. Protrusion 26 on tip pod 16 prevents any further motion of pivoted portion beyond a prescribed value.

Some comments on the structure are convenient. The link system is loaded in tension during extension of the pivoted portion, and in the fully extended position, the link system if desired, may be unloaded for positive lifting air loads, even in the absence of locking pins, because the hinge axis 9 is located in the wing's lower surface, and the upper surfaces of the wing would be sufficient to prevent additional upward motion of the pivoted panel. It is also possible to construct the link system of slightly smaller dimensions such that the circular tip pod enclosing it need not exceed in depth the depth of the retracted compound wing.

Finally, the tip pod is occupied by the retraction mechanisms only at discrete stations, in this case near the wing's spars. Hence the remaining portion of it should preferably be used to house fuel, armament, aileron control systems, flap actuators, landing gear and the like.

With reference to FIGURE IV, there is shown the cross-section of the compound airfoil corresponding to cut 4—4 of FIGURE I, made by a fixed upper airfoil 15 in a normal upward position, below which there is located a separate airfoil 14, which is shown retracted below the first airfoil, in an inverted position. Airfoil 14 is pivoted to 15 at the tip of 15 at hinge axis 9 as explained in reference to FIGURE III, whereby the area of the combination in the extended position has been substantially doubled. The front view of the method of retraction and extension of the compound airfoil is illustrated in FIGURE V, described later.

Returning now to FIGURE IV, there is shown in a vertical chordwise plane, the common hinge line 9 between the tip of the fixed part 15 and the root of the pivoted part 14. This common hinge line 9 may be set, if desired, at an incidence with respect to each of the parts to produce in the extended position an effective wing twist, especially if the pivoted panel should have a smaller chord than the fixed panel. As an example it is shown in FIGURE IV in the retracted position that the meeting of the lower and upper surfaces at 28 falls above the hinge line 9. Hence in the extended upright position (not shown) the leading edge entry of fixed part 15 would make an effective geometric washout or twist of the outer pivoted portion 14 with respect to the inner fixed portion 15. This is important to prescribe a higher effective angle of attack to the inner fixed portion, and thereby promote stall of the inner fixed portion before the outer part stalls. With this stall pattern, roll control may be provided by the trailing edge portion (described later) of the unstalled pivoted wing part during the stall of the inner fixed wing part. Conversely, the outer portion may be made to stall first, by opposite choice of leading edge-hinge line relationship, in which case roll control should be provided, preferably by trailing edge device on the fixed unstalled portions, as will be explained later. The latter stall sequence may be desirable when the tail surfaces are located in the wing wake and may be blanketed by the stall of inboard wing panels. Since the retracted compound wing is used at high speeds at very low lift coefficients, a symmetric airfoil section could be used advantageously and simplify construction of parts. In such a case, the thickness and camber used in airfoils such as 15 and 14 may be identical, resulting in a symmetric compound airfoil. In FIGURE IV the panel 15 has a greater thickness for structural and aerodynamic reasons and panel 14 has a smaller thickness, but at least as much effective camber as 61c, for aerodynamic reasons. As shown in FIGURE IV, airfoil 14 is thinner than 15, but has a greater camber. The compound airfoil however, has slight positive camber since 15 is thicker, and of a different shape compared to 14.

The compound airfoil wing should provide a smooth low drag leading edge geometry in the retracted position, but allow a high lift geometry for each of the components in the extended position. One solution to these double requirements is shown in FIGURE IV by the peculiar shape shown approximately to scale in the drawing, consisting of a thin airfoil entry with very high local camber for both airfoils. Observe that the outer surfaces of the leading edges of each of the airfoils form the nose of a low drag compound airfoil in the retracted position. Yet the thin highly cambered surfaces act as high lift leading edge flaps for each of the airfoils in the extended position. It can be seen that each of the airfoils, in the extended position, would have the upper and lower surfaces of the leading edge portion concave downwards.

In FIGURE IV there is also shown in the upper wing 15 and lower wing 14 their corresponding trailing edge slotted flaps 29 and 30. 29 and 30 may be hinged, each at their own hinge line 31, which preferably should be located at the "lower" surface of each of the flaps in the extended position. Essentially hinges 31 act, and may be thought of for kinematic purposes, in the retracted position, as a single hinge line. In the retracted position as shown in the drawing, the flaps form essentially a single trailing edge device which may be controlled—through proper mechanical arrangements—simultaneously and together as an aileron for the aircraft. In the extended position flap 29 becomes a high lift flap on inner fixed wing portion and flap 30 acts as an aileron on outer pivoted wing portion. The converse arrangement is also possible. It is also feasible, and indeed desirable, to have the hinge line of each flap located according to normal practice in which case similar deflection of the flaps in the retracted position for roll control purposes can be obtained by permitting relative slip of the inner adjacent surfaces of the flap when both are displaced angularly. This relative slip may be permitted by prescribing an empty space or gap between the inner adjacent flap surfaces. In another modified arrangement, the flap hinge lines may be located at the nose of each flap. In this case, the method of operation of flap structure of FIGURE IV in the retracted position as ailerons would be independent operation of each flap, for example to produce a down force, raise 29 with 30 stationary.

As mentioned earlier, to illustrate the retraction principle of the compound wing there is shown in FIGURE V a front view of an aircraft utilizing compound wing of FIGURE I. FIGURE V has the centrally located fuselage 1 to which are attached fixed wing portions 7 and 15 on the aircraft's left and right side, respectively.

The fixed wing portion may have variable incidence in the fuselage, if desired. To wing tip portion of fixed panel 15, there is connected through the general chordwise pivotal axis 9 (out of paper) the pivoted panel 14 shown in the retracted position forming the lower half of the compound retracted airfoil (corresponding to 14 in FIGURE I). When extended to a high lift position 14 pivots about hinge 9 as shown by dash circular arc 32, downward and then upward to fully extended position shown in dash lines, wherein the pivoted wing portion forms a continuation of the fixed wing portion. In the left side of FIGURE V there is shown as an alternate arrangement to a tip pod, vertical chordwise plates 33 and 34 respectively, at the tip of fixed portion 15 and root of pivoted portion 14. In the extended position, shown in solid lines, plates form a contiguous chordwise aerodynamic fence between the upper surfaces of the fixed and pivoted wing portions. In the retracted position, plates form a wing tip plate for the retracted compound airfoil. The tips of pivoted wing portion 14 are beveled to allow compatability of geometry in the retracted position, with fixed portion root reinforcement 34. A chordwise locking pin between the fixed portion and tip portion is schematically indicated as 35.

In the right side of FIGURE V there is shown the compound wing, extended with inner fixed panel 7 continued by pivoted panel 8. Returning now to a cross-section view of the compound airfoil, I show other methods of obtaining smooth low drag nose shape for high speed of the retracted compound airfoil, and yet high lift in the extended position.

FIGURE VI shows pivoted airfoil 36 with a large fixed leading edge radius 37 and high local camber 38, and fixed airfoil 39 with articulated curved plate 40 at its leading edge. This plate forms part of the leading edge surface of the compound airfoil in the retracted position, and also acts as a leading edge flap for the fixed airfoil supporting it, when the pivoted airfoil is in the extended position. Plate 40 is shown articulated to permit mutual retraction of compound airfoil parts, and to permit varying its angle to act as an efficient aerodynamic leading edge flap when the pivoted wing part is open. (This latter angle is not shown in drawing.) High lift slot 41 is shown.

FIGURE VII shows a smooth leading edge for the compound airfoil in the retracted position, made by two matching but different leading edge shapes of the individual airfoils. Observe that highly cambered nose 42 of lower airfoil 44 falls within leading edge cavity 43 of upper airfoil 45. (Naturally the mirror image of FIGURE VII would also be suitable geometry.) One particular advantage of structure of FIGURE VII is that no moving parts are required for this low drag high lift compound wing leading edge arrangement. The drawing is shown as substantially a scale drawing for a NACA 23015 compound airfoil section in the retracted position. It is possible to use slightly modified known airfoils to form a compound wing. I have calculated, for instance, that a compound airfoil of high speed retracted cross-section corresponding to the NACA 0018, can be made by a combination of two airfoils similar to the NACA 43009 or the 43009 and the NACA 4409. Yet in another combination, I have calculated that two airfoils like the NACA 6306 can form a retracted compound airfoil, similar in some respects to the NACA 63018. Other known airfoils that could be used as a basis for compound airfoil combinations are the NACA 23009, 63009, 43012, 6206 and other similar airfoils.

In the following figures, I show compound airfoil nose shapes in retracted position suitable for high subsonic speeds or supersonic speeds, and yet developing high lift in the extended position at landing speeds. In these drawings, for convenience, the upper wing portion is understood to be the fixed wing portion, and the lower wing portion to be pivoted to the fixed portion as explained in FIGURES V and IV. The reverse however, would also be applicable. FIGURE VIII shows generally to scale the leading edge of a 6% airfoil like the NACA 64–006. There is shown upper fixed airfoil 48 having a pivoted leading edge flap of about 9% wing chord shown retracted as 49 and in one extended position in dash lines 50. Also shown schematically in dash lines 51 is a flat actuating mechanism. The lower pivoted airfoil is shown inverted as 53 having its own chord about 10% less than the upper airfoil chord and a thicker cambered leading edge entry 54 (shown inverted). Also shown is lower airfoil's leading edge flap 55, shown retracted. This flap may be actuated by a torque tube 56 shown schematically in the leading edge flap region of lower airfoil, concentric and external to tubular leading edge spar 57.

Because of the thicker leading edge radius and high camber possible in the lower airfoil leading edge portion, it is necessary that this lower part should have its own flap only if very high lift is desired from the lower portion in the extended position. The inverted image of this arrangement would also be suitable, wherein the shorter chord portion becomes the upper fixed part of the compound airfoil.

FIGURE IX shows another compound airfoil leading edge geometry illustrated for simplicity for a generally symmetric or similar high speed airfoil section. In view of the general symmetry it is only necessary to describe the high lift device on one of the parts of the compound airfoil, with the understanding that the high lift device of the remaining lower half would be substantially similar to it, even in the case that the compound airfoil were not perfectly symmetrical but designed for positive lift coefficients at high speeds. Specifically, FIGURE IX shows an upper fixed airfoil 59, extending above the compound airfoil's line of symmetry 60. Chordwise pivotal axis of compound wing in this arrangement also coincides substantially with 60. Observe that fixed upper surface 59 extends forward up to its intersection to line of symmetry 60. The most forward fixed part of the fixed airfoil 59 is substantially at the most forward point of the compound airfoil section. The upper fixed part 59 supported by a pivotal spanwise axis 61 (out of paper) and attached to the inner forward concave portion of 59 above line 60, a retreated leading edge flap 63 which in its extended high lift position as shown in solid line 62 has its forward upper most external surface in contact with the aforementioned foremost portion of fixed wing part 59 at the intersection of the latter with line 60, such as to provide a smooth continuous surface for the gaseous flow along the upper surface of the leading edge flap and around the leading edge of the fixed portion 59. Hinged axis 61 is located above line of symmetry 62 such that when leading edge flap is fully retracted, it falls completely above line of symmetry 60, as shown by flap-retracted position dash lines 63. It is therefore evident that a lower pivoted airfoil section indicated by dash-dot lines 64 could be provided with a substantially similar high lift flap, which if it were shown in the drawing in the retracted position, it would appear as the inverted image, about line of symmetry 60, of the leading edge flap 63. It is seen therefore that the arrangement of FIGURE IX allows complete retraction of each of the parts of the compound wings into the high speed low drag envelope shown by the outside surfaces of compound airfoil of FIGURE IX. Observe that the airfoil shown in FIGURE IX in the extended position and with the flap retracted, could be used for high speed flight under effects of compressibility and in supersonic flight. Thus such a compound wing could be used to vary the aircraft's wing area at any speed to suit variations of gross weight, center of gravity location, altitude, etc., as will be indicated later with reference to subsequent figures.

FIGURE X shows another low drag high lift leading edge geometry for the compound airfoil. In this case it also shows a generally symmetric 6% thick compound airfoil, hence again only the upper fixed wing half leading edge flap mechanism is shown in the figure arranged within the over-all compound airfoil leading edge. Specifically, fixed airfoil 66 has a support bracket 67 which supports leading edge flap 68 by means of flap bracket 69 attached to the leading edge flap 68. Brackets 69 and 67 are joined at spanwise pivot axis 70 (into paper). Also shown is optional leading edge flap blowing duct 71 and blowing slot 72. It should be observed that as shown, brackets 69 and 67 protrude into the volume of lower pivoted wing portion 73, when the latter is in the retracted position. This is done in order to allow a maximum radius of bracket 69, preferably at last of the order of 4% of the airfoil chord, as in this example, to minimize adverse curvature behind blowing slot when flap 68 is deflected (a position not shown). This arrangement necessitates, for compatability of retraction, alternate spanwise bracket location for the lower pivoted airfoil 73 own leading edge flaps, which brackets would in turn be housed in the wing retracted position within the volume available in the fixed upper portion. Other methods to provide high lift geometry for the leading edges of the compound wing portions in the extended position consists of pneumatically variable flexible surfaces, or inflatable rubber leading edges, for slow speed flight. These devices can be housed completely within the compound wing when the latter is retracted, by suitable installation of them on the inner surfaces of the compound wing. Since this type of leading edge device is known in the state of the art—for instance, U.S. Patents 2,912,190, 2,937,826 and 2,934,288, it is not necessary to explain them in detail, except that the installation is greatly simplified insofar as the devices are not required to have a low drag arrangement in the high speed position. In the latter position, the leading edge devices would be housed completely within the compound wing.

In FIGURE XI, I show a compound airfoil nose section made by a highly cambered lower pivoted panel 75 having a large leading edge radius nose 76 housed within an upper fixed airfoil 77 having a hinged droop leading edge 78 hinged at axis 79. To allow emergence of the pivoted portion 75, droop nose 78 is angularly displaced upwards by about 30° from the position shown. Once the compound wing is extended, the droop nose can be displaced downward to a high lift position, about 15° or more beyond the position shown in the drawing. The hinge line 79 of the droop nose should preferably be located above and/or ahead of the leading edge of the lower airfoil. The chord of the droop nose 78 should be approximately of the order of 10% of the upper airfoils total chord. It is also possible to locate the droop nose hinge in a lower position (like 70 of FIGURE X), in which case the droop nose should be modified to allow emergence of lower part of compound airfoil.

In the previous description of folded compound wing cross-sectional shapes, and in FIGS. I to IX, I have described in detail the leading edge geometry which should preferably be used in the invention. It should be noted that even though it is well known how to design conventional high lift airfoil shapes for conventional wings, the same criteria by itself obviously does not apply for my compound wing which, in the folded position has the added requirement of a smooth and streamlined low drag mating of the two superposed airfoils one inverted relative to the other, with leading edge portions which combine into convex shapes and each of which should be capable nevertheless of developing high-lift when unfolded.

Immediate superposition of conventional airfoils have been proposed in the past for folding wing systems used for storage and in other unrelated structures. The resulting structures show combined cross-sectional shapes which are not suitable for flight in that they have what amounts to two aerodynamically effective leading edges which do not permit smooth circulatory lift and obviously increase drag tremendously due to their non-streamlined shape. For example, superposed panels with a combined shape having two aerodynamically effective leading edges with a concave channel in between is shown in FIG. 2 of French Patent 560,810 in 1923, and similar figures in U.S. Patent 1,748,262. Obviously such a superposed cross-sectional shape should not be used for high-lift or high-speed flight.

By way of contrast, my invention shows a single aerodynamically effective leading edge for the special cross-sections of my folded compound wing which permits low drag and efficient development of circulatory lift, and with the cross-sections having a smooth low drag combined contour in the folded disposition and nevertheless a high lift cambered shape for each of the panels in the unfolded position. Example in which my invention shows a single aerodynamically effective leading edge are shown in FIGS. I, IV to XI and XVII, and in the related specification to those and to the other figures. These contours avoid multiple leading edge arrangements shown in the aforementioned Patents 560,810 and 1,748,262. By inspection of the superpositions in the latter patents it may be seen that the upstream edge of the lower wing panel is separate from the upstream edge of the upper panel and from the surface of the upper panel. This separation is large and aerodynamically obviously unfavorable; it produces a concave semi-channel facing upstream and formed between the upstream edges of the lower panel and the forward lower surface and upstream edge of the upper panel. This semi-channel obviously produces drag and is obviously adverse for smooth circulatory lift. These are adverse aerodynamic features exhibited by a combination which may be described as having two aerodynamically effective leading edges.

In contradistinction to do unfavorable geometry of the above described superposition of panels, my combined airfoils show that the upstream nose portion of one of the panels which is exposed to the airstream is faired into the surface of the other panel to combine into a single efficient airfoil with a single aerodynamically effective leading edge. For example in FIG. IV the upstream edges of both panels are next to each other, in FIG. VII one leading edge is buried into the other, and in FIG. XVII the upstream edge of the lower panel which is exposed to the airstream is mated to the lower surface of the upper airfoil adjacent to it. In my figures the mated airfoil exhibit convex surface portions without channels or blunt shapes.

It is of significance to note also that it is preferable not to superpose the panels of the compound wing in the unfolded position, for instance see my FIGS. I and V. This is because of the geometry of the panels which as shown in my figures describing cross-sectional shapes, have outer convex surfaces exposed to the airstream which exhibit an airfoil curvature or camber in a plane perpendicular to the spanwise dimension and which, if they are mated for low drag in the folded panel position as they should, then if they were to be unfolded to a position in which a portion of the auxiliary panels overlapped the principal panels, the overlapped portion would have two aerodynamically effective leading edges and would appear of a shape similar to the unfavorable shape of the above mentioned patents. This overlapped portion would cancel or greatly decrease the increments of lift sought by the structure.

Such a shape and overlapped disposition of panels would be undesirable also because such a structure would fail to fully use the entire area of the auxiliary panel to increase lift, and span of the wing. I have thus far described some embodiments and preferred cross-sectional shapes of my compound wing. I now show several types of aircraft incorporating my compound wing and other features of the invention.

FIGURE XII show an ingenious application of the compound wing to an amphibian aircraft. It is well known that amphibians are slower than land planes because of their greater drag and weight. Part of this drag and weight is contributed by tip floats, even if retractable. It is also known that at high speed water taxiing in which aileron forces are sufficient for roll control, tip floats are unnecessary for water roll stability and are also dangerous as they may inadvertently touch the water and introduce large water impact loads to themselves and torsional loads to the wings. Also, fixed tip floats are detrimental to mooring operations which are essential for seaplane work. In this application of the compound wing, a single structure is used to permit a variation of wing area and tip float retractable structure to increase maximum speed, an increase of wing span and wing area for slow speed and take-off operations, and also to provide means to raise the level tip floats above from the water level for high speed taxi and mooring operations. Specifically there is shown a front view of seaplane hull 102 floating in water having a level 101. To hull 102 there is attached a fixed normal airfoil 103, the outboard section of which is recessed in its lower portion 111 to become part of a compound airfoil. The pivoted part of the compound airfoil is shown in solid lines 104 in an intermediate position used for static or slow speed water operations. Observe that the outermost portion 113 of the pivoted wing portion 104 is shaped to serve as a tip float when in the position shown. For high speed water operation and during the latter part of the take-off maneuver, as well as at the earlier parts of the alighting maneuver, when aerodynamic forces are available, the pivoted portion of the compound wing is changed for high lift to position shown in dash dot lines 106 forming a continuation of fixed wing 103. In the high speed condition the pivoted wing portion is retracted to dash line position 105 in which it forms the lower part of the compound high speed airfoil below recession 111 in fixed wing portion 103. Position 105 is also useful for mooring operations.

To provide a relatively large part of the span with a compound airfoil, fixed wing portion may be installed with relatively large dihedral angle 107 to raise hinge line high above the water and therefore, to prevent "dutch-roll" oscillations in slow speed operations, the outer pivoted portion of the compound airfoil is set in its high lift position with a small negative dihedral angle 108. This angle permits the designer to vary the roll-yaw relation due to dihedral at will. The roll control of the aircraft using a compound wing like in FIGURE XII should be provided in the high speed position by trailing edge flap type ailerons (not shown) on fixed wing portion 103. On the slow speed regime, when aerodynamic forces are available, roll control preferably should be shifted to trailing edge ailerons on the pivoted wing portion which portions should then be in the extended high lift position, and the inboard trailing edge flap type ailerons on the pivoted wing portion should then be used as flaps for high lift on the fixed wing portions.

In another arrangement, the trailing edge of the fixed wing part is divided in inboard flap and outboard ailerons, and is therefore capable of supplying roll control independent of position of pivoted portion of compound airfoil. With this arrangement pivoted portion may supplement, with its own trailing edge devices, either the roll or high lift functions ascribed to the trailing edge of the fixed wing portion.

Yet another simplified method of operation is to retain roll control at all times with ailerons in the fixed wing part 103 which should preferably be droop ailerons, or spoiler type ailerons in the outer portion of the flapped fixed wing portion. In this latter arrangement, the trailing edge of the pivoted portion of the compound wing in the extended position provide one function only, preferably high lift.

FIGURE XIII is very similar to FIGURE XV, except that instead of a seaplane it shows a landplane with stabilizing outrigger type landing gear mounted on pivoted portion of a compound wing. Specifically there is shown a partial front view of an aircraft which has a substantial portion of its weight supported statically in the ground by means of a centrally located main landing gear 123 attached to central fuselage 121. Fuselage 121 supports a normal fixed wing 124, the outboard portion of which is modified to become a compound wing, as explained in earlier figures describing compound wings. The pivoted portion of the compound wing is shown as 125 in position used for ground operation at zero or at speeds in which aerodynamic roll control forces are not significant. The outboard extremity or tip of the pivoted portion supports a small wheel 130 which prevents the aircraft from tipping. The over-all width of the wheel 130 may be greater than the thickness of the pivoted portion of the compound wing, but preferably should not be greater than the thickness of the fixed wing portion 124. In the retracted position, suitable for high speed, the pivoted wing portion of the compound airfoil retracts into position 127 in which wheel 130 is housed completely within fixed wing part 124 by a suitable door (door and wheel not shown) provided to allow its entrance and emergence. The pivoted portion of the compound wing is shown in the high lift position by dash-dot line 128. It may have a relatively large positive dihedral angle 129 for the slow speed operation. Roll control for aircraft of the type of FIGURE XIII should be of the same characteristics as roll control described in reference to FIGURE XII.

FIGURE XIV shows a planform view of a compound wing, with the right wing portion in the retracted position and the left wing portion in the extended position. Relative airstream is shown by arrow 241. This planform view of a compound wing prescribes the effect of hinge line location in the plane of the wing on roll and yaw characterisitcs during extension and retraction of pivoted portions of the compound wing. It also sets the pitch contribution of the extended pivoted portions. The figure also illustrates more clearly the location and function of roll control surfaces and trailing edge flaps described in connection with earlier figures. Specifically there is shown a fuselage 231 having a longitudinal axis 233. To the fuselage there are attached right and left fixed portions 232 of a compound wing. On the right wing the pivoted portion is retracted below the fixed portion. It therefore does not appear specifically in the drawing since this position coincides generally below the fixed portion shown. On the left side, the left fixed portion 232 is shown supporting the extended pivoted portion 239 at common hinge axis 235. Common hinge axis 235 is shown angularly displaced to the right, or "toed in," from line 234 by an angle 236, by an order of magnitude of about 5°. Line 234 is parallel to the center line 233 on the fuselage. The effect of toe in angle 236 on pitch characteristics is explained as follows: When the aircraft approaches the landing condition, the compound wing is unfolded and the flaps are lowered. Lowering the flap introduces negative pitching moments which in this arrangement are counter-acted by positive pitching moments caused by a forward displacement of the pivoted wing portion in reference to the fixed wing position and in reference to the over-all aircraft C.G., as determined by toe in angle of common hinge line. This is best illustrated by referring to the drawing and observing that the pivoted portion 239 is displaced forward from line 242 when unfolded, and observing that in the retracted position it falls closer to line 242. Line 252 is an imaginary reference line, perpendicular to fuselage centerline 233. It is seen that the area of unfolded pivoted portion 239 has its centroid ahead of the centroid of area of fixed portion 232. Hence lift force of 239 contributes a positive pitch when unfolded to counter-act negative pitch of flaps as mentioned earlier. Another beneficial effect of toe-in angle 236 is present during the extension or retraction process of pivoted wing portion in which the pivoted portion may contribute side forces. Evidently, when pivoted portions are vertical, the toe in angle produces a stabilization effect in yaw, similar to toe-in tip fins on rectangular flying wings, which tends to relieve the necessity for accurate directional control of the aircraft during retraction or extension of tip surfaces. This effect is also present when the pivoted portions are partially retracted or extended, such as to produce a negative effective dihedral angle on the aircraft. It is also possible to utilize "toe out" of hinge line to improve directional characteristics of compound wings during retraction and extension, especially if the fixed portion of the compound wing is swept back and the pivoted portion is not swept (as for example in FIGURE XVI) or is also swept. In some cases it is desirable to minimize interaction between side forces on the partially retracted pivoted portions and the aircraft. This can be accomplished by having the zero lift vector of the pivoted portion coincident with the local airflow direction. In this example, the zero lift vector should be parallel to vector 241.

FIGURE XIV also shows trailing edge devices 237 in the fixed portion and 238 in the pivoted portion. In the retracted position, both of these surfaces are one on top of the other, as in the right side of the figure, and they move together up and down as explained in reference to FIGURE IV. When the pivoted portion is not retracted, as in the left side of the figure, trailing edge 237 may provide roll control, even during extension of pivoted portion. The pivoted portion then has its trailing edge drive device 238 used as a trailing edge high lift flap. I have already discussed other methods of roll control by trailing edge devices, and mechanisms for extension and retraction in earlier figures.

In connection with FIGURE XIV, I now indicate one additional purpose of trailing edge device 238 in pivoted panel 239 of the compound wing. Evidently by deflecting trailing edge device 238 downward or upwards, the panel 239 experiences aerodynamic forces that appear perpendicular to its surface in a direction opposite to the sense of deflection of the trailing edge device. Hence it is possible to retract and extend the pivoted portion by proper manipulation of the trailing edge device at its trailing edge. This feature may be used as the main, or an auxiliary method to retract and extend the pivoted surface. To exemplify this operation, assume that extended pivoted portion 239 of the compound wing on the left of FIGURE XIV is to be retracted by aerodynamic means to a position below the fixed portion 232. Evidently all that is needed is an upward deflection (out of paper) of trailing edge 238 to provide a force perpendicular to the panel 239 in a direction opposite to the sense of flap deflection. This force continues perpendicular to the panel throughout panel rotation about axis 235 until the pivoted portion is retracted. Angle 236 evidently helps in this rotation. The steady speed of rotation of the pivoted portion is determined by an aerodynamic damping phenomena due to the rotation of the pivoted wing portion about its chordwise axis, which is a function of the planform of the pivoted portion and is directly analogous to the well-known "planform damping in roll" which appears during a rolling maneuver of an aircraft about a generally chordwise C. G. axis. The extension process of the pivoted wing portion by aerodynamic means would be the reversal of the process described for its retraction. It should be observed however, that the initial ("upward") flap deflection for extension will require a similar deflection of the flap in the fixed wing portion to produce a negative pressure in the forward pivoted portion of the wing to initiate the motion. The extension motion can also be begun by a rapid change of pitch of the aircraft introduced by the pilot to produce inertia forces in the pivoted portion in a direction tending to separate the pivoted portion from the fixed portion. Such an aerodynamic and/or inertia process described is ideally suited for a safety feature in case of malfunction of an additional mechanism of retraction and extension.

FIGURE XV shows the planform of a compound wing, preferably to be used in aircraft which have stringent economic and performance requirements on continuous operation at various altitudes, at a wide range of subsonic and supersonic speeds, and with a varying weight, such as fuel consumed or cargo discharged. The directon of motion of the aircraft may be either to the top or to the bottom of the page, as indicated by double arrow 255. There is shown a fuselage 251 supporting on its right hand side a compound wing 253 in its retracted position suitable for high speed flight at reduced aircraft weights, for extremely high speeds, or for flight at lower altitudes. Compound wing 253 is shown holding a streamlined payload container 255 which also serves to house retraction mechanisms and other equipment. On the left side of the figure there is shown the compound wing in the extended position having fixed panel 253 supporting pivoted panel 254 at common generally chordwise hinge axis 252. This extended position is used for operation at high subsonic speeds and supersonic speeds with the aircraft fully loaded, or at very high altitudes, and during landing and take-off. Preferably the variation of geometry of FIGURE XV is to be performed symmetrically on the aircraft. It is shown unsymmetrically in the drawing for illustrative purposes. Also, although a full span compound wing has been shown, it would also be advantageous for structural purposes to use a part span compound wing, for example, of the order of one half of the airplane or less in combination with the remaining normal fixed wing. One such application would be for a supersonic transport or bomber, which has to operate at various altitudes, and with widely varying fuel weight, and at speeds which range from low subsonic to high supersonic speeds.

FIGURE XVI shows a peculiar application of the compound wing for aircraft which have supersonic speeds. It is well-known that the position of the center of pressure on a wing varies drastically from subsonic to supersonic speeds. For instance, a rectangular symmetrical wing has its center of pressure at 25% chord in subsonic speeds and at 50% chord at supersonic speeds. To obtain satisfactory stability and control in the presence of this large variation of center of pressure location with regime of speed results in complications of the aircraft. The structure of FIGURE XVI has as a main feature the variation of the planform of a compound wing such as to strongly displace the area of the wing in a fore and aft location (in addition to the spanwise displacement) in order to have its center of pressure in the immediate vicinity of the aircraft's center of gravity, both in the supersonic speed regime (compound wing retracted, aft center of pressure) and in the subsonic speed regime (compound wing extended, forward center of pressure). Specifically, FIGURE XVI shows a fuselage 261 having a centerline 262 and an aircraft center of gravity 268. To the fuselage there is attached a fixed panel 269 of a compound wing. The fixed panel is shaped such that with the pivoted portion in the retracted position below it (not shown), and at supersonic speeds, the center of pressure of the retracted compound wing is in the vicinity of the aircraft center of gravity, preferably slightly behind it as shown by position of panel 269 in reference to C.G. 268. For a canard type airplane (not shown in figure), the center of pressure would also be preferably slightly behind the center of gravity. In the extended position shown, the pivoted portion 266 of the compound wing is supported to the fixed portion 269 at common hinge axis 265 which is shown "toed out" with reference to line 263 by an angle 264 towards the wing tip. Line 263 is parallel to centerline 262. The extended position is used for subsonic speeds. Evidently, displacing the surface of the pivoted portion backwards by the proper choice of angle 264 (as well as in a spanwise direction) results in displacing the over-all area of the extended combination (at subsonic speeds) backwards with reference to the C.G. location, which in turn allows a relative forward location of the C.G. close to the aerodynamic center of the extended combination at subsonic speeds. The latter relative location is possible because the aerodynamic center location is displaced by means of the displacement of the area centroid. The exact value of the angle 264 depends on the sweep of fixed wing portion 269. Also it should be observed that moving the pivoted portion of the wing backwards also contributes a small aft shift of the C.G. location. Hence it is not possible to prescribe exactly angle 264 without assuming a sweep angle and some relative mass distribution of the aircraft. It is sufficient to say therefore, that the center of pressure of the extended compound wing in subsonic speeds should fall in close vicinity of the center of gravity of the aircraft, or slightly behind it, by the proper selection of the angle 264. For an aircraft having its fixed portion swept back by about 45°, like in FIGURE XVI, the "toe out" angle of the common hinge line may be of the order of 15°. It should be observed that partial extension of the pivoted portions is also advantageous to change or increase directional and lateral stability at various speeds, including supersonic speeds; therefore the compound wing struc-lift function at slow speed and low drag function at high speed.

I shall now explain the effects of variable wing area, by means of the compound wing, on the pitch static stability characteristics of the aircraft. Three basic solutions are included to provide adequate pitch static stability with a varying wing area, the choice of which depends upon the particular use of the aircraft. First, the horizontal tail surfaces may be designed sufficiently large to provide adequate pitch stability and control with the compound wing extended. In this arrangement, with the compound wing retracted, there will be no lack of pitch stability, since the wing area is decreased with wing retraction. This solution is advantageous for aircraft optimized principally for slow speed high lift.

Secondly, the horizontal tail surface may be designed in size to provide a prescribed high speed stability requirement with the compound wing retracted. If it is desired not to change the stability characteristics with the wings extended, then the chord length of the pivoted portion may be descreased and shifted in a chordwise direction. For instance, for a rectangular wing it may be shifted backwards, with reference to the fixed wing portion as shown in crossview FIGURES VIII and XI, in order to displace backwards the resultant lift force on the pivoted portion towards a fore and aft location corresponding to the fore and aft location of the airplane's center of gravity. Another way to accomplish this lack of change of static longitudinal stability with the unfolded compound wing consists of setting the hinge line between the pivoted portion and the fixed portion of the compound wing with a toe-out angle, in a horizontal plane and with respect to a chord parallel to the longitudinal axis of the fuselage, such that when the pivoted portion is extended, the resultant lift vector on it acts at a chordwise location on it which falls on the same fore-and-aft location as the aircraft's C.G. In other words, the longitudinal "station" of the lift vector acting on the pivoted portions of the compound wing should be the same "station" of the airplane's C.G. Such an arrangement is preferable to minimize tail surface area. In the order to illustrate this toe-out effect, reference is made to the planform of FIGURE XIV, omitting the trailing edge devices 237 and 238 and reversing the relative wind direction. Evidently, reversing the vector 241 converts the "toe in" angle 236 described in earlier reference to this figure, into a "toe out" angle, useful to displace the resultant force of pivoted panel 239, with reference to an aircraft's center of gravity in a manner tending to prevent a change of the static longitudinal characteristics with the unfolding of the compound wing.

If it is desired to increase the static pitch stability with the compound wing extended for the given tail size, then the fore-and-aft location of the lift vector on the pivoted portion should be placed at a station to the rear of the C.G. station. Conversely, if the stability with the compound wing extended is to be decreased, then the lift vector location on the extended portion should have a fore-and-aft station ahead of the C.G. The latter arrangement is advantageous to reduce pitching moments due to flap, as explained earlier, in reference to FIGURE XIV, and to allow a greater effectiveness of the elevator control for a given elevator power.

Third, it is possible to vary the area of the horizontal tail surface to meet the wing area variations, either be conventional wing area variation methods, by boundary layer control on the tail, or by a "compound wing" type of horizontal tail.

In the preceding pages I have discussed the cross-sectional geometry of compound wings, the desired camber and thickness of each of the components, the location of the chordwise hinge in a vertical chordwise plane as it affects wing twist, the compatability of leading edge geometry for high speed low drag and high lift at landing speeds including leading edge flaps, and the use of wing fences, tip pods and fairings in reference to the compound wing. I have presented special uses of the compound wing for aircraft operating out of aircraft carriers, for amphibians, and for land planes using a main centrally located gear. These latter structures have the additional advantages that several useful functions are combined into the compound wing structure which is very beneficial, since certain features in aircraft can be better justified and utilized when a single structure performs more than one function, as in this case. I have shown mechanisms to operate the compound wing. These mechanisms have the added advantage that they have to support only low speed loads, and hence can be made lighter than normal mechanisms used to vary the geometry of aircraft of conventional variable-geometry types, such as variable sweep aircraft. The latter aircraft use mechanisms which have to endure loads developed at high speeds and by large accelerations.

It is evident that the compound wing is also applicable to other aerodynamic surfaces such as tail surfaces, elevators, rudders, fins and the like. I have also discussed the possibilities of planform variation of a compound wing as this affects pitch yaw roll and directional stability, center of pressure location, variations of altitude, gross weight and speed of operation, and pitch stability and control.

Some additional numerical calculations on embodiments of the preceding invention are made to show the effect of the compound wing on the aerodynamic characteristics of aircraft.

We first consider the case of a subsonic airplane modified with a compound wing in order to increase its lift for a given wing area. We assume that the unmodified wing had aspect ratio of 5 and a 15% thick section, with a maximum lift coefficient with flaps of 2.4. The modified airplane, using a full span compound wing, for instance of the type illustrated in FIGURES IV and V, has doubled its span and area with the wings unfolded. Its maximum lift coefficient remains at least substantially the same, since the leading edge shown for the component parts of the compound airfoil may be designed principally for high lift only, and trailing edge devices are also provided. Therefore, the maximum lift force of the airplane with the compound wing has been doubled by doubling the area. This is of most benefit in the landing maneuver or in slow speed flight. In addition, the wing's induced drag coefficient has been halved for the wing-extended position, since the aspect ratio has been doubled. Hence, although there is an increase of skin drag proportional to the increase of wing area, there is a substantial decrease of induced drag, especially at high lift coefficients. We compare the drag force for the unmodified wing of aspect ratio 5 with the drag force for the same wing modified with a full span compound wing installation, at the same takeoff and climb speed which for this example is assumed to correspond to a representative lift coefficient of 1.3 for the unmodified wing. At these speeds low drag is important for efficient climb. Using well known aerodynamic formulae, and also with reference to formula (6.27), page 146, "Principles of Aerodynamics" by Dwinell (1949 edition) we calculate the wing drag D for the unmodified and modified wing installations at the speeds in question:

$$D = C_D Q S \tag{I}$$

where $Q$=dynamic pressure, $S$=effective wing area exposed to flow, and $C_D$=total wing drag coefficient. Now $$C_D = C_{Do} + C_{Di} \tag{II}$$

where $C_{Do}$=profile drag coefficient assumed 0.006 from FIGURE 12, NACA TR824, and $$C_{Di} = \frac{CL^2(1+J)}{3.14 AR}$$

is the induced dry coefficient where $J$=planform factor (ref. Dwinell FIG. 6.19) and $AR$=aspect ratio.

We evaluate Equation II for the unmodified wing: ($J=0.04$)

$$C_{Du} = 0.006 + \frac{(1.3)^2}{3.14(5)}(1.04) = 0.006 + 0.112$$

$$C_{Du} = 0.118$$

We evaluate Equation I for the unmodified wing with a wing area assumed equal to $5C^2$ where $C$=wing chord:

$$Du = 0.118 Q(5C^2) = 0.590 Q C^2$$

We now evaluate Equation II for the wing modified with a full span compound wing unfolded ($J=0.008$), but noting that unfolding the wing for the same takeoff weight and speed as the unmodified wing decreases the wing lift coefficient because the wing area has been increased. (Note: the lift coefficient for a given speed and weight has been halved by the doubling of area of wing; this follows from the relation $$C_L = \frac{L}{QS}$$

where Q is a constant for the given speed, L is another constant equal to the weight of the aircraft, and S a variable which increases by a factor of 2). We write then, for Equation II with subscript C.W. meaning compound wing unfolded:

$$C_{D_{CW}} = 0.006 + \frac{(0.65)^2}{10} \frac{(1.08)}{3.14} = 0.006 + .0145$$

$$C_{D_{CW}} = 0.0205$$

We now evaluate Equation I for the unfolded compound wing structure recalling that the effective wing area is now $(5C^2) 2 = 10C^2$ $$D_{CW} = C_{D_{CW}} Q S_{CW} = 0.0205 Q 10 C^2$$

$$D_{CW} = 0.205 Q C^2$$

We conclude that for take-off and climb maneuvers, the drag of the compound wing is substantially lower than that of the unmodified wing, thereby allowing excess horsepower to be used for climbing.

Although this calculation has been made for a 15% thick airfoil, it is also applicable for thin compound airfoils suitable for supersonic speeds, provided the compound airfoil in the extended position has leading edge flaps like in FIGURES IX and XI. Even without leading edge flaps, the relative magnitudes of the calculation are still indicative of the benefits accrued from the system.

We next consider the case wherein the compound wing is used to increase the maximum speed by decreasing the wing area for a given landing speed suitable for existing airports. We therefore consider a standard wing aspect ratio 7 and compare it to a compound wing of aspect ratio 7 in the extended position and aspect ratio 3.5 in the retracted position. Let the standard wing have the following characteristics:

| | |
|---|---|
| Chord | C. |
| Span | 7C. |
| Area | $7C^2$. |
| Thickness | 12% |

Section Drag Coefficient=0.006 (ref FIGURE 12a NACA TR824). Let the compound wing have the following characteristics, in the retracted position:

| | |
|---|---|
| Chord | C. |
| Span | 3.5C. |
| Area | $3.5C^2$. |
| Thickness | 18% (assuming each panel is 9% thick). |

Section Drag Coefficient=0.007 (ref FIGURE 12a NACA TR824). Comparing the drag at high speeds, where the induced drag is unimportant, we can calculate that the wing drags vary in proportion to their drag coefficients, and the area of the surfaces. Hence, the ratio of the compound wing drag to the standard wing drag would be, for these conditions:

$$\frac{.077 \times 3.5C^2}{.006 \times 7C^2}$$

or about 0.55.

I conclude that the high speed drag can be substantially reduced by the compound wing.

These calculations and the previous illustrations and descriptions have been made by way of preferred embodiments, but not by way of limitation. Obviously it is not necessary to use a full span compound wing, nor is it necessary to use it exclusively for drag reduction or lift increments.

It is also desirable in some instances to use in the leading edge of the compound wing airfoils, leading edge slats and/or fixed slots instead of leading edge flaps and droop noses shown in FIGURES IV, and VII to XI. For instance, both airfoils of FIGURE VIII could be modified with a fixed slot like 41 of FIGURE VI. The droop leading edge of FIGURE XI could be changed to a slat that moves forward and downward to allow an emergence of the lower wing. The latter could have a fixed slot covered by the slot of the upper wing. More particularly, the structure of FIGURE X can be easily modified into an efficient pivoted slot by eliminating the optional boundary layer control channel 71 and changing the lower surface of 68 such that the modified cross-section 68 becomes a cambered airfoil section with its trailing edge at 72. Additionally, the upper forward curved surface of airfoil 66 is modified to have a progressively shorter radius from a point directly below 72 and adjacent to it, to the most forward portion of the modified airfoil, thereby forming a smooth airfoil nose of decreased chord from the one shown in the drawing.

Evidently, with this modified geometry, deflection of the slot downward along a circular path prescribed by pivoted bracket 69 opens up a gap between the trailing edge of the slot, which travels along a circular arc, beginning at 72, and the modified forward upper surface of the modified fixed airfoil, since the latter has been prescribed to have a progressively decreasing radius from the slot-up closed gap starting radius. The gap serves, of course, to re-energize the flow in the upper surface of the wing, by means of the high speed airflow through the gap.

Other details of installation of the compound wing are the use of rubber or other soft materials to seal the gaps at the leading edge, between the compound wing parts. The retracted relative positions of the compound wing elements may be used to seal high lift slots in them, or at least to prevent air flow through them in the retracted position. These and other modifications are shown in FIGURES XVII through XX. These figures are alternate forms of the structures described earlier; hence, a brief description will suffice for each in light of the earlier related specifications.

FIGURE XVII is a modified structure of a compound wing cross-section of the type shown in FIGURE IV. Specifically, there is shown an upper fixed panel 380 supporting a trailing edge flap 381 by bracket 384 and a leading edge door 382 located in the leading edge lower surface, which allows entrance and emergence of lower pivoted wing panel. Observe that, in contradistinction to FIGURE IV, the flap 381 on the upper fixed portion is free to operate at all times, regardless of the position of the lower pivoted wing panel. It may act as an aileron or as an efficient slotted flap. The lower portion of the slot is covered, in the wing's retracted position, by the trailing edge device of the lower pivoted panel.

The functions of the lower door 382 are three: It allows entrance and emergence of the lower pivoted panel from a low drag retracted configuration shown in the figure, it may close the optional slot gap 388 on the lower panel in the wing's retracted position, and in the wing's extended position, by deflecting it upwards from the position shown along the upper portion of path 383, it serves to form a smooth leading edge lower surface, and to accomplish a camber change of wing panel 380. The lower portion of the figure shows pivoted wing panel 385 having a chord approximately equal to 75% of the chord of the fixed airfoil, and having a highly cambered thick leading edge 389 with an optional slot 388 and a wing panel trailing edge flap 386. The trailing edge flap 386 is supported by flap bracket 387 which, in the retracted position, protrudes within the volume of the upper fixed wing.

FIGURES XVIII and XIX show front elevations of alternate methods to hinge compound wing panels. These two figures show different kinematic arrangements related to the type of structure shown in FIGURES II and III. FIGURE XVIII shows a partial front elevation of a compound wing tip portion having an upper fixed wing panel 411 supporting at generally chordwise hinge axis 413 (into paper) a lower pivoted panel 412. In the retracted position, the outboard ends of the panels are each terminated by a beveled edge having surfaces 415 and 416 (generally perpendicular to the plane of the paper) forming an angle with the plane of the wing which when measured in a counter-clockwise direction is shown to be of the order of 25°. These surfaces need not have the same bevel angle, but intersect substantially at the hinge axis. To extend the lower pivoted portion, it should be rotated about hinge line 413, down and up along path 417 to extended position 414, wherein beveled portion 415 falls adjacent to beveled portion 416. The relative dihedral angle between the panels in the extended position may be adjusted by the degree of bevel. However, the degree of bevel should not be excessive, since this would result either in an increase of drag in the retracted position due to an abnormal retracted tip airfoil section in the beveled portion, or in a low lift portion in the extended position, where the beveled portions are adjacent to each other. This is due to the fact that it is evidently not feasible to optimize the beveled portions of the panel, both for maximum lift in the extended position and minimum drag in the retracted position. A flat bevel, for instance, would be fair for high lift, but has a high drag in the retracted position. Hence, the bevel angle should be kept fairly large, and preferably no smaller than 10° when measured in a counter-clockwise dimension.

FIGURES II, III and XVIII have shown the pivoted panels hinged to each other substantially at adjacent chordwise panel edges, which determine the wing tip portion of the retracted compound wing.

FIGURE XIX shows a different hinge arrangement for compound wing panels, in which the pivoted panel is hinged inboard of the tip of the fixed panel. Again, in a partial front elevation, there is shown upper fixed panel 421 supporting by means of bracket 423 a generally chordwise hinge axis 425 (into paper) which in turn supports the pivoted lower wing panel shown retracted in position 422. Observe that the tip of 422 has a semi-circular cross-section concentric with axis 425 and that upper fixed panel projects outboard beyond said hinge axis. To extend the lower pivoted panel, it should be rotated downwards and then upwards about hinge axis 425 along path shown as arrow 426 to an extended position 424 wherein it falls partially below the upper fixed portion.

The arrangement of FIGURE XIX is useful to reduce some of the loads on the hinge pins, because the root bending moments due to the loads carried or caused by the extended pivoted panel can be resisted by an opposite couple having the relatively long arm provided by the distance between hinge line 427 and the outermost tip portion of the upper fixed panel 421 (appropriate tip supports should be provided for this case). However, it has the disadvantage of a low speed high drag when the two airfoils are extended, but superposed by that same distance, and it also causes loss of lift due to that super-position as well as to the decrement of projected span-wise area of the pivoted panel. Therefore the distance between the hinge 427 and the tip of fixed panel 421 should be kept to a minimum. For instance, as a lower design limit, it is desired to have the shear forces due to lift on the pins reduced to ⅓ the value of the bending moments present at the root of the extended pivoted panel. In this case then, the distance between the hinge axis and the tip can be made approximately three times as large as the root thickness of the pivoted panel, thereby reducing hinge pin loads due to lift on the pivoted panel with a fairly small loss of lift.

FIGURE XX shows a front elevation of a pivotal connection for a compound wing having the structural advantages of FIGURE XIX, but with improved aerodynamic characteristics. In this figure, the hinge line between the pivoted panel and the fixed panel are also shown inboard from the tip 438 of the fixed panel to reduce hinge loads due to forces on the pivoted panel. Specifically, there is shown upper fixed wing panel 431 supporting a hinge axis 434 (supports not shown) inboard of its own tip portion. The pivoted panel is shown in front elevation retracted in position 432, behind the leading edge portion and within the volume of the fixed airfoil 431 in a manner similar to that of FIGURE XVII. Observe however, that the outboard vertical edge of the pivoted retracted panel terminates at an inboard position from the hinge axis, and is therefore connected to it by brackets 433 extending from its chordwise edge to the hinge axis. The length of the bracket determines the magnitude of the hinge loads. To extend the pivoted panel to a high lift position, it is rotated about hinge 434 by approximately 180° along arc 436 to position 435 wherein it has its edge adjacent to the tip edge 438 of the fixed panel, and it forms spanwise continuation of fixed panel 431. In that position, a locking device (not shown) should be provided between the compound wing panels. Evidently, in contradistinction to FIGURE XIX, this arrangement permits the use of a continuous airfoil section between hinge axis 434 and the tip of upper fixed panel 431, thereby substantially eliminating the lift and drag losses associated with the tip of the structure of the aforementioned figure. It is evident that the adjacent panel tips of FIGURE XX may be modified to a round or beveled cross-section and still retain the advantages of it. FIGURES XVIII to XX are obviously schematic in nature and are used to illustrate the basic arrangements and their associated structural and aerodynamic characteristics. Variation of the arrangements is obviously possible. The various details of construction and the means to operate them may be those described in connection with earlier related structures, or others which are readily available within the state of the art. The mode of folding and unfolding the panels is the same as disclosed in relation to other similar and related structures of this invention. It should be observed that although the upper panel has been referred to as a fixed wing panel, and the lower as a pivoted panel, order can be reversed. The word "fixed" is not meant to exclude variable incidence wings.

With reference to the hinge mechanisms required for the pivoted wing structures of figures, I can use my structures of FIGURES II, and III which are capable of 180° rotation of wing panels. Evidently other mechanisms normally used to fold the wings of aircraft operating out of aircraft carriers can be used or modified for these purposes, especially if less than 180° of rotation are required. Evidently, some standard types of retractable landing gear mechanisms are also useful or adaptable for this purpose. It is useful to summarize some of the details of the location and orientation of the hinge connection between the panels of a compound wing.

As has been shown in most of the structures present in this invention, the hinge connection is generally located substantially at the wing tip portions of the retracted compound wing, and in the plane of the wing. For instance, see hinge line 9 of FIGURE I or hinge line 265 of FIGURE XXVI. The location at the wing tip portion of the retracted compound wing is advantageous since it allows substantially all of the surface of the pivoted panel of the compound wing to project beyond the fixed panel in the spanwise direction, in order to have substantially all of the span and area of the pivoted panel contributing to the lift of the extended compound wing.

I have described the effect of the location of the hinge line in a vertical plane passing through it, on the aerodynamic characteristics of the compound wing. The relative location of the hinge line on the panels has been shown (see FIGURE IV) capable of introducing a geometric wing twist in the extended position which, when related to the angle of stall of the panel portions, is useful to determine the desirable spanwise progression of stall. Finally, the exact chordwise direction of the hinge line in the plane of the wing has been shown to depend upon the type of aircraft using it. For instance, in relation to a spanwise axis equidistant from the leading and trailing edge portions of the fixed panel and generally contained therein, it can be seen that the hinge line direction varies from a perpendicular direction to it as in FIGURE I, to an oblique direction at about 45° to it as shown in FIGURE XVI. Evidently increasing the sweep angle may decrease the angle between the spanwise axis and the hinge line. I summarize some of the general characteristics of the invention. The compound wing has been shown to consist of a wing portion which need not have a span equal to the total span of the aircraft, and which is split into an upper and a lower wing panel. In the folded position suitable for low drag high speed flight, the panels complement each other to form an efficient low drag airfoil. The panels are hinged at two adjacent generally chordwise edges, and one of them is supported by the other. In the unfolded position, the supported panel is rotated about its hinge axis by approximately 180° to a position in which it forms a spanwise extension of the supporting panel. The angle of rotation of the supported panel may vary according to the dihedral angles in the combination. I have shown embodiments using a full span compound wing or a part span compound wing. The structures are also applicable to tail surfaces.

Another general characteristic of the invention is the shape and over-all proportion of the panels, and of the aircraft using them. In the structure shown, the pivoted panels of the compound wing have a wing chord substantially of the same order as the chord of the fixed panel, and the embodiments utilizing a smaller pivoted panel chord have it approximately 50% of the chord of the fixed panel. Also in all cases the variation of position of the pivoted panel is useful to produce an efficient increase of the over-all span and area of the combination from a retracted position, to a larger over-all span and area in an extended position. Preferably the entire surface of the pivoted panel should be used to increase the span and area of the extended structure. Other general characteristics of the invention are aerodynamically and structurally efficient panel planforms which need not be identical, but generally similar and with straight line edges. In special cases however, such as a highly tapered planform on the fixed panel, the taper of the pivoted panel may be somewhat smaller than the taper of the fixed portion, or may even be rectangular. Also, for structural advantages a tapered pivoted panel may be used together with a rectangular fixed panel, or a tapered pivoted panel, of which in the extended position forms a continuation of the taper of the fixed panel. With reference to the spanwise thickness distribution of the pivoted panel, it should preferably be substantially linear over most of its surface to enable the construction of single curvature panel skins around the type of airfoil section described with some details in this invention.

With reference to the aforementioned wing twist introduced by a proper location of the hinge line of the compound wing panels, it should be observed that this is a very advantageous feature as it allows, in essence, a variable twist wing. It is well known that the slow speed aerodynamic twist requirement is related to a safe spanwise stall progression, but that such a twist usually introduces drag penalties at high speed cruise. The related features described in FIGURE IV have shown how geometric twist can be introduced to the wing. It is not convenient to express aerodynamic twist in terms of one structural element, as indeed it depends upon many variables such as the spanwise distribution of camber, high lift devices, thickness, reynolds number, induced angle of attack, etc. However, if it is desired to avoid a simultaneous stall of both the fixed and pivoted panels, this condition can be more clearly expressed in terms of an arbitrary effective zero lift line on each of the panels, and the maximum angle of attack of each of said panels measured with reference to their respective angle of zero lift. A zero lift is an arbitrary line through the airfoil parallel to the direction of the remote relative wind direction which produces no lift.

As will be evident to those skilled in the art, to prevent a simultaneous stall of the panels, all that is sufficient is to have the differences of direction of the zero lift lines of the panels as defined above in the high lift position and measured in degrees, numerically different from the differences of the maximum angle of attack of the panels, measured in degrees.

The use of leading and trailing edge high lift devices has been specified for purposes of optimizing the possible lift from the compound wing panels, especially in the case of the thinner wings. It is well known that the lift of an airfoil section depends upon such devices. Thus, if even a relatively thick pivoted compound wing section like the NACA 23012 were used without flaps, the lift coefficient it could develop (lift coefficients of about 1.6) would be of the order of 1.6.

On the other hand, if a pivoted wing panel is used with leading flaps and trailing flaps, it may develop a high lift coefficient of the order of 3.3 or more, for instance the NACA 23012 with a double slotted flap (ref NACA WRL 469). An airfoil thinner than the 23012 but with a leading edge fixed slot, or a pivoted slot, as well as an efficient trailing edge flap, develops also very high lift coefficients. Hence, the importance of carefully prescribing the airfoil geometry of the compound wing panels, as it is seen that this factor alone can substantially double the lift of the pivoted panel by the proper choice of a high lift arrangement. These general characteristics, as well as other details contained in the specifications and drawings, are related to one of the fundamental purposes of the compound wing structure, which is to increase the area, span lift and control of aerodynamically lifting surfaces by the utilization of structurally and economically efficient and practical structures. Evidently, for a given degree of mechanical complexity inherent in any variable geometry system, like in the compound wing, it is desirable to obtain the maximum aerodynamic and performance gains that indeed justify the use of such systems in an aircraft.

It is with these objectives in mind that I have carefully specified the geometric, structural and aerodynamic characteristics of my compound wing. As I have mentioned earlier, some of the VTOL applications of the compound wing simplify the leading edge structure, since there is no low speed requirement of them. For instance, in the various helicopter applications shown, and in the deflected slipstream VTOL of FIGURE XXX, the cross-section of the wing panels may omit the peculiar curvatures of the nose sections. These simpler cross-sections may be, for example, similar to those of FIGURE IX, with the leading edge flaps removed, for the left side of FIGURE XVII. Other airfoils, including the flat bottom Clark Y and the like, may be used conveniently.

While several specific structures embodying my invention have been illustrated and described in detail herein, it is obvious that many modifications in the structure may be made without departing from the spirit and scope of the invention.

The actual scope of the invention is to be indicated by reference to the appended claims.

What I claim is:

1. A compound wing for aircraft having a variable surface area exposed to the airstream comprising a primary airfoil panel having a root portion adapted to be mounted on a central body portion of said aircraft and an outboard primary airfoil tip portion, and an auxiliary panel mounted on said primary panel for pivotal movement from a folded flight position under and substantially immediately adjacent to said primary panel where said panels form a high speed folded compound wing of decreased span and surface area exposed to said airstream, to an unfolded position in which said panels form a high lift unfolded compound wing having a span and surface area exposed to said airstream substantially exceeding said decreased span and surface area of said high speed folded compound wing; with substantially the entire area of the surface of said auxiliary panel, which in said folded position faces downwardly and is exposed to said airstream defining in said unfolded position an upwardly facing airfoil surface having substantially its entire surface area exposed to the airstream of said unfolded compound wing.

2. The structure of claim 1 further characterizes in that said primary airfoil panel has an upper surface and a cambered cross-sectional shape, in that said auxiliary panel has a cambered cross-sectional shape, in that when said auxiliary panel is in said folded position the cambered cross-sectional shapes of said primary airfoil panel and said auxiliary airfoil are inverted one relative to the other and are mated with the combined external contours of said airfoil shapes determining a folded compound wing airfoil contour having substantially the entire leading edge portion of convex shapes; and in that said surface of said auxiliary panel is a convex surface and said upper surface of said primary panel is a convex surface.

3. A compound wing having a variable surface area exposed to the relative airstream comprising a principal wing panel having tip edge portions and an under surface, and auxiliary wing tip panels each having a first approximately chordwise edge portion substantially parallel to one of said tip edges portions of said principal panel, a second approximately chordwise edge portion remote from said first chordwise edge portion, and auxiliary panel surfaces extending between said first and second chordwise edge portions, with said auxiliary tip panels movably mounted on said principal panel for movement between a folded compound wing flight position of decreased area, surface drag and span in which the surfaces of said auxiliary panels are approximately horizontal, below and immediately adjacent to said under surface of said principal panel in an overlapped disposition relative to said principal panel in which overlapped disposition said auxiliary panels have downwardly facing auxiliary panel convex surfaces exposed to the relative airstream and an unfolded position of increased area and span in which said auxiliary panels are inverted to an approximately horizontal outboard position beyond said tip portions of said principal panel with said convex surfaces facing upwardly and with substantially the entire surfaces of said auxiliary panels exposed to said relative airstream augmenting the lifting area and span of said principal panel, and with substantially the entire area of said undersurface of said principal panels in said unfolded position being, are exposed to said relative airstream augmenting the lifting area of said unfolded compound wing.

4. The structure of claim 3 further characterized in that said auxiliary panels are mounted on said principal panels by generally chordwise axes of articulation located at said tip edge portions and connecting said first chordwise edge portions of said auxiliary panels to said tip edge portions of said principal panel.

5. The structure of claim 4 further characterized in that said axes of articulation have, in vertical planes passing through said axes and with respect to the chordline of the airfoil section of said principal wing panel adjacent to said axes, a small negative incidence angle, and in that when said panels are moved from said folded position to said unfolded position said auxiliary panels have less effective angle of attack than the effective angle of attack of said principal wing panel thereby introducing an effective wing twist.

6. The structure of claim 3 further characterized in that the planform shape of said surfaces of said auxiliary wing panels is similar to the planform shape of the portion of said principal wing panel above said auxiliary panels when said auxiliary panels are in said folded position.

7. The structure of claim 3 further characterized in that the area of said surfaces of said auxiliary wing panels is approximately the same as the area of the portion of said principal wing panel above said auxiliary panels when said auxiliary panels are in said folded position.

8. The structure of claim 3 further characterized in that said principal wing panel and auxiliary wing panels in said folded position have an aerodynamic center of folded wing area; trailing edge flaps are mounted in one of said principal wing panel and auxiliary wing panels which flaps produce a nose-down pitching moment when deflected; and in that the location of the aerodynamic center of the surfaces of each of said auxiliary wing panels in said unfolded position is ahead of the location of said aerodynamic center of said folded wing area, whereby a pitch-up couple is introduced by the lifting forces on said auxiliary panels which acts against said nose-down pitching moment.

9. The structure of claim 3 further characterized in that movable trailing edge portions are provided on said principal wing panel and said auxiliary wing panels; in that when said auxiliary panels are in said folded position, the movable trailing portions of said auxiliary panels are located below and substantially immediately adjacent to the movable trailing portion of said principal wing panel with said movable trailing portions of said auxiliary and principal panels being capable of simultaneous angular motion; and in that, when said auxiliary wing panels are in said unfolded position, said movable trailing portion of said principal wing panel is adapted to be moved downwards to increase the camber and lift of said principal wing, and said movable trailing portion of said auxiliary wing panels are movable independently to provide roll control for said aircraft.

10. The structure of claim 3 characterized further by the inclusion of means for moving each of said auxiliary wing panels comprising articulated trailing edge portions on said auxiliary wing panels which are movable with respect to said auxiliary panels in a direction to deflect air away from the direction of intended panel motion.

11. The structure of claim 3 further characterized in that said principal wing panel has a slotted movable trailing edge portion with a slot intake mouth and said auxiliary panels have movable trailing edge portions; and in that when said auxiliary panels are in said folded position the surfaces of said movable trailing portion of said auxiliary panels cover said slot intake mouth of said movable trailing portion of said principal wing.

12. An aircraft comprising the structure of claim 3 further characterized in that center of gravity of said aircraft with said auxiliary wing panels in said folded position lies substantially to the rear of the quarter chord position of the mean aerodynamic chord of said wing and folded auxiliary wing panels; and in that the center of gravity of said aircraft with said auxiliary panels in said unfolded position lies approximately at the quarter chord location of the mean aerodynamic chord of the combined area of said principal wing panel and said auxiliary panels in said unfolded position.

13. The structure of claim 3 further characterized in that the planform shape of said principal wing panel with said auxiliary panels folded is a swept wing planform and in that the planform shape of said principal wing panel and said auxiliary wing panels in said unfolded position has the approximate shape of one of the letters M and W.

14. The structure of claim 3 further characterized in that said principal wing panel and said auxiliary panels in said folded position have positive dihedral with respect to said central body portion, and in that said auxiliary panels in said unfolded position have negative dihedral angle with respect to said principal wing panel, whereby the pitch and roll characteristics of said aircraft remains satisfactory for said folded and unfolded auxiliary panel positions.

15. The structure of claim 3 further characterized in that said surface of said auxiliary wing panels in said folded panel position are substantially parallel to said principal panel, and in that said surfaces of said auxiliary wing panels in said unfolded position have a small angle of incidence with respect to the chord of the principal panel, whereby an effective wing twist is introduced when said auxiliary panels are in said unfolded position.

16. The structure of claim 3 further characterized in that each of said auxiliary wing panels in said folded position has a lower surface which is formed by spanwise surface elements which are substantially rectilinear surface elements.

17. The structure of claim 3 further characterized in that each of said auxiliary wing panels in said unfolded position has an upper surface and a lower surface, and in that the line elements determined by the intersection of said surfaces with a vertical plane in a spanwise direction are substantially straight line elements.

18. The structure of claim 3 further characterized in that said aircraft has main alighting gear means on said body portion and supplementary alighting gear means for lateral stabilization mounted on said auxiliary panels with said supplementary alighting gear means having surfaces exposed to the relative airstream when said auxiliary panels are in said unfolded position; and in that when said auxiliary panels are in said folded position a substantial portion of said surfaces of said supplementary alighting gear means are faired by, below, and immediately adjacent to, said principal wing panels whereby the drag due to said supplementary alighting gear means is reduced for high speed flight.

19. A foldable compound wing for aircraft having a variable surface area exposed to the airstream comprising a principal lifting panel having an overall spanwise dimension, approximately chordwise tip edge portions, a cambered top surface, and a lower surface of decreased camber; and a pair of auxiliary lifting panels each having a first chordwise edge substantially parallel to one of said chordwise tip edges of said principal lifting panel, a second chordwise edge remote from said first chordwise edge, a first auxiliary panel cambered surface and a second auxiliary panel surface of decreased camber with said surfaces extending between said first and second chordwise edges of each of said auxiliary lifting panels, means mounting each of said auxiliary lifting panels on said principal lifting panel at an approximately chordwise axis of articulation connecting said first chordwise edge of each of said auxiliary panels to one of said tip edge portions of said principal panel; and means for moving each of said auxiliary panels with respect to said principal panel between a folded position of low surface drag in which each of said auxiliary panels is located in an approximately horizontal position inboard of said chordwise tip edge portions of said principal panel below and substantially immediately adjacent to said principal panel, in which folded position the combination of the surface of said principal panel portion overlapping said auxiliary panels which is exposed to an airstream together with the surfaces of each of said auxiliary panels which are exposed to the airstream combine to form the top and bottom surfaces of a folded compound wing, said top and bottom surfaces of said folded compound wing defining in a plane perpendicular to said overall folded dimension of said principal panel an airfoil contour of said folded compound wing having small camber and a leading edge section portion with a single aerodynamically effective leading edge and smooth low drag contours, and an unfolded position in which said surfaces of each of said auxiliary panels are located substantially outboard of said chordwise tip edge portions augmenting the span and area of said principal panel and defining an overall unfolded compound wing spanwise dimension, said unfolded compound wing having, in a plane perpendicular to said unfolded dimension, an airfoil cross-sectional shape with a single aerodynamically effective leading edge and with an airfoil camber greater than said small camber of the airfoil section of said folded compound wing.

20. The structure of claim 19 further characterized in that the cross-sectional shape of said principal lifting panel and auxiliary lifting panels of said compound wing in said unfolded position has a leading edge portion having a concave and approximately semicylindrical channel in their undersurface substantially immediately adjacent to and above the leading edge of said panels which channel determines an under cambered airfoil nose portion; and in that said panels fold to said folded positions with the leading edges of said auxiliary panels substantially immediately adjacent to the leading edge of said principal panel and with said channels removed from the airstream about said folded compound wing.

21. The structure of claim 19 further characterized in that the cross-sectional shape of one of said panels of said compound wing in said unfolded position has a leading edge portion with a concave and approximately semicylindrical channel in its under surface substantially immediately adjacent to and above its leading edge which determines an under cambered airfoil nose portion; and in that the cross-sectional shape of another of said panels of said compound wing in said unfolded position has a leading edge portion with a large camber and a large leading edge radius approximately determining the cross-section of a convex protuberance; said one and said other panels folding to said folded position with said protuberance located substantially adjacent and mated to said concave channel.

22. The structure of claim 19 further characterized in that one of said panels of said compound wing in said unfolded position has a high lift leading edge slot with a fluid intake mouth and a fluid exhaust mouth, and in that another of said panels of said compound wing in said folded position has its surfaces covering one of said fluid intake mouth and fluid exhaust mouth of said high lift leading edge slot.

23. The structure of claim 19 further characterized in that at least one of said panels of said compound wing in said unfolded position has a camber increasing leading edge flap which is retractable and in that when said compound wing is folded said leading edge flap is retracted between said top and bottom surfaces of said compound wing.

24. The structure of claim 19 further characterized in that at least one of said panels of said compound wing in said unfolded position has a camber changing flap supported by a flap bracket projecting below the undersurface of its supporting panel, and in that when said compound wing is folded said flap bracket is located between said top and bottom surfaces of said compound wing protruding into and faired by another of said panel of said folded compound wing.

25. The structure of claim 19 further characterized in that at least one of said panels of said compound wing in said unfolded position has a slotted flap with a slot intake mouth, and in that when said compound wing is in said folded position, surfaces of another one of said panels cover said intake mouth of said slot.

26. The structure of claim 19 further characterized in that one of said panels of said compound wing has a leading edge flap and another of said panels has a leading edge slot having a slot intake mouth and a slot exhaust mouth, and in that when said compound wing is in said folded position said intake mouth is housed between said top and bottom surfaces of said folded compound wing and said leading edge flap of said one of said panels is superposed externally and immediately adjacent to said another panel in a position covering said slot exhaust mouth.

27. The structure of claim 19 further characterized in that the airfoil contour of said folded compound wing has reduced maximum camber of approximately one percent of the length of the chord and a maximum thickness approximately equal to eighteen percent of the length of the chord, and in that said airfoil cross-section of the unfolded compound wing has a positive camber of approximately three percent of the length of the chord and a maximum thickness approximately equal to nine percent of the length of the chord.

28. An aircraft having a central body portion and a pair of wings mounted thereon with each of said wings having an overall spanwise dimension, a wing tip edge portion, a cambered top surface, and an undersurface of decreased camber; a pair of auxiliary lifting panels each having a first chordwise edge portion substantially parallel to one of said wing tip edge portions, a second chordwise edge remote from said first chordwise edge portion, a first auxiliary panel cambered surface, and a second auxiliary panel surface of decreased camber, said first and second auxiliary panel surfaces extending between said chordwise edges of each of said auxiliary panels; means mounting each of said auxiliary panels on one of said wings for relative angular movement of said auxiliary panels with respect to said wings about a chordwise articulation, said chordwise articulations being located substantially immediately adjacent to one of said chordwise tip edge portions of said wings and connecting said first chordwise edge portions of each of said auxiliary panels to one of said chordwise tip edge portions of said wings, said relative angular movement of said auxiliary panels extending between a low drag folded position of decreased span and area in which the surfaces of each of said auxiliary panels are located approximately horizontally below and substantially immediately adjacent to the undersurface of one of said wings and in which folded position the combination of the surface portion of one of said wings which is exposed to the airstream and which is overlapping its corresponding auxiliary panel together with the surface of said corresponding auxiliary panel which is exposed to the airstream combine to form the top and bottom surfaces of a folded compound wing portion, said top and bottom surfaces of said folded compound wing portion defining, in a plane perpendicular to said overall spanwise dimension of said wings, the airfoil cross-sectional shape of said folded compound wing portion having small camber and a leading edge section portion with a single aerodynamically effective leading edge and aerodynamically smooth low drag contours and an unfolded position in which the surfaces of each of said auxiliary panels augments the area and span of one of said wings and defines an overall increased compound wing portion spanwise dimension, each of said auxiliary panels having said first cambered surface above its said second surface, and said unfolded compound wing portion having, in a plane perpendicular to said unfolded dimension, an airfoil cross-sectional shape with a single aerodynamically effective leading edge and a leading edge portion having a greater leading edge camber than the leading edge camber of said airfoil section of said folded compound wing portion.

References Cited in the file of this patent

UNITED STATES PATENTS

| | | |
|---|---|---|
| 1,887,676 | Brylka | Nov. 15, 1932 |
| 2,120,250 | Houston | June 14, 1938 |
| 2,289,224 | Swanson | July 7, 1942 |
| 2,387,528 | Arsandaux | June 19, 1945 |
| 2,511,362 | Mercier | June 13, 1950 |
| 2,756,007 | Laskowitz | July 24, 1956 |
| 2,844,337 | MacArthur | July 22, 1958 |
| 2,881,989 | Flettner | Apr. 14, 1959 |
| 2,925,233 | Dunn | Feb. 16, 1960 |
| 2,959,373 | Zuck | Nov. 8, 1960 |

FOREIGN PATENTS

| | | |
|---|---|---|
| 560,810 | France | July 19, 1923 |
| 908,748 | France | Oct. 15, 1945 |
| 1,003,096 | France | Nov. 14, 1951 |
| 554,690 | Great Britain | July 15, 1943 |